(12) United States Patent
McClure

(10) Patent No.: US 11,434,951 B2
(45) Date of Patent: Sep. 6, 2022

(54) TEMPORARY FASTENERS

(71) Applicant: Centrix Inc., Kent, WA (US)

(72) Inventor: Travis D. McClure, Kirkland, WA (US)

(73) Assignee: Centrix Inc., Kent, WA (US)

( * ) Notice: Subject to any disclaimer, the term of this patent is extended or adjusted under 35 U.S.C. 154(b) by 131 days.

(21) Appl. No.: 16/355,469

(22) Filed: Mar. 15, 2019

(65) Prior Publication Data

US 2019/0211862 A1 Jul. 11, 2019

Related U.S. Application Data

(60) Division of application No. 13/037,349, filed on Feb. 28, 2011, now Pat. No. 10,260,548, which is a
(Continued)

(51) Int. Cl.
*F16B 19/10* (2006.01)
*F16B 13/06* (2006.01)
(Continued)

(52) U.S. Cl.
CPC ............ *F16B 19/109* (2013.01); *F16B 13/06* (2013.01); *F16B 13/0833* (2013.01); *F16B 33/002* (2013.01)

(58) Field of Classification Search
CPC ...... F16B 19/109; F16B 13/06; F16B 13/063; F16B 19/1081; F16B 13/045; F16B 33/002; B25B 31/005
(Continued)

(56) References Cited

U.S. PATENT DOCUMENTS 777,134 A 12/1904 Palmer
1,978,935 A 10/1934 Douglas
(Continued)

FOREIGN PATENT DOCUMENTS

GB 413403 A 7/1934
GB 1548964 A 7/1979
(Continued)

OTHER PUBLICATIONS

ISA Korean Intellectual Property Office, International Search Report Issued in Application No. PCT/US2009/004884, dated Apr. 20, 2010, WIPO, 3 pages.
(Continued)

*Primary Examiner* — Flemming Saether
(74) *Attorney, Agent, or Firm* — McCoy Russell LLP

(57) ABSTRACT

A fastener is provided that includes a housing body including a bore extending along a longitudinal axis from a proximal end of the housing body, a housing body anti-rotation part, and a reduced diameter opening at a distal end of the housing body, a collet body partially translating within the housing body bore, having a collet body anti-rotation part positioned at least partially within the housing body, and a plurality of clamping fingers axially extending from a wall portion of the collet body, and a removable bushing positioned at least partially in the housing body bore. Rotation of the collet body is substantially prevented by an interaction between the housing body anti-rotation part and the collet body anti-rotation part during fastener clamping and unclamping and the removable bushing and the reduced diameter opening in the bore prevent escapement of the collet body anti-rotation part from the housing body.

10 Claims, 8 Drawing Sheets

Related U.S. Application Data continuation of application No. PCT/US2009/004884, filed on Aug. 26, 2009.

(60) Provisional application No. 61/208,188, filed on Feb. 20, 2009, provisional application No. 61/190,215, filed on Aug. 26, 2008.

(51) Int. Cl.
  *F16B 13/08*     (2006.01)
  *F16B 33/00*     (2006.01)

(58) Field of Classification Search
  USPC ... 411/80.1, 80.2, 80.5, 80.6, 55, 17, 21, 32; 269/48.2–48.3
  See application file for complete search history.

(56) References Cited

U.S. PATENT DOCUMENTS

| | | | |
|---|---|---|---|
| 2,370,336 A | 2/1945 | Wallace | |
| 2,379,786 A | 7/1945 | Bugg et al. | |
| 2,649,884 A | 8/1953 | Westover | |
| 2,775,155 A | 12/1956 | Tompkins et al. | |
| 2,936,015 A | 5/1960 | Rapata | |
| 2,994,242 A | 8/1961 | Buff et al. | |
| 3,233,504 A * | 2/1966 | Sterlings | F16B 19/109 269/48.3 |
| 3,236,144 A | 2/1966 | Taylor | |
| 3,426,399 A * | 2/1969 | Sterlings | B25B 31/005 269/48.1 |
| 3,469,493 A | 9/1969 | Fisher | |
| 4,537,542 A | 8/1985 | Pratt et al. | |
| 4,548,533 A | 10/1985 | Pratt | |
| 4,553,889 A | 11/1985 | Le Dantec et al. | |
| 4,834,600 A | 5/1989 | Lemke | |
| 4,892,449 A | 1/1990 | Croxton | |
| 4,899,431 A | 2/1990 | Borntrager | |
| 4,934,885 A | 6/1990 | Woods et al. | |
| 5,065,490 A | 11/1991 | Wivagg et al. | |
| 5,228,731 A | 7/1993 | Glass | |
| 5,240,361 A | 8/1993 | Armstrong et al. | |
| 5,704,752 A | 1/1998 | Logerot | |
| 5,927,919 A * | 7/1999 | Blankenship | F16B 19/109 411/60.1 |
| 6,287,044 B1 | 9/2001 | Huber | |
| 6,712,573 B1 | 3/2004 | Huber | |
| 6,827,345 B2 * | 12/2004 | Anderson | B21J 15/42 269/48.1 |
| 7,993,085 B2 | 8/2011 | McClure | |
| 8,075,234 B2 | 12/2011 | McClure | |
| 8,517,650 B2 | 8/2013 | Niklewicz et al. | |
| 9,709,085 B2 | 7/2017 | McClure | |
| 2002/0144574 A1 | 10/2002 | Avetisian et al. | |
| 2005/0169726 A1 | 8/2005 | McClure | |
| 2007/0243037 A1 | 10/2007 | Pratt | |
| 2008/0213063 A1 | 9/2008 | Pratt | |
| 2016/0363146 A1 | 12/2016 | Branyon, III et al. | |

FOREIGN PATENT DOCUMENTS

| | | |
|---|---|---|
| JP | S5083456 U | 7/1975 |
| JP | H1151018 A | 2/1999 |
| JP | 2005517876 A | 6/2005 |
| JP | 2006183726 A | 7/2006 |
| WO | 03069971 A2 | 8/2003 |

OTHER PUBLICATIONS

ISA Korean Intellectual Property Office, Written Opinion Issued in Application No. PCT/US2009/004884, dated Apr. 20, 2010, WIPO, 3 pages.

State Intellectual Property Office of the People's Republic of China, Office Action Issued in Application No. 200980142743.X, dated Nov. 5, 2012, 30 pages.

European Patent Office, Extended European Search Report Issued in Application No. 09811814.4, dated Feb. 11, 2013, Germany, 5 pages.

State Intellectual Property Office of the People's Republic of China, Office Action Issued in Application No. 200980142743.X, dated Aug. 19, 2013, 11 pages.

Japan Patent Office, Office Action Issued in Application No. 2011-525000, dated Oct. 1, 2013, 4 pages. (Submitted with Machine Translation).

European Patent Office, Office Action issued in Application No. 09811814.4, dated Feb. 18, 2014, Germany, 5 pages.

State Intellectual Property Office of the People's Republic of China, Office Action Issued in Application No. 200980142743.X, dated Mar. 26, 2014, 12 pages.

Japan Patent Office, Notice of Allowance issued in Application No. 2011-525000, dated Sep. 2, 2014, 6 pages. (Submitted with Machine Translation).

European Patent Office, Office Action Issued in Application No. 09811814.4, dated Jan. 29, 2615, Germany, 3 pages.

European Patent Office, Notification of Third Party Observation Issued in Application No. 89811814.4, May 12, 2015, Germany, 48 pages.

State Intellesctual Property Office of the People's Republic of China, Office Action Issued in Application No. 200980142743.X, dated Jun. 18, 2015, 12 pages.

European Patent Office, Office Action Issued in Application No. 09811614.4, dated Sep. 15, 2015, Germany, 4 pages.

State Intellectual Property Office of the People's Republic of China, Notice of Allowance Issued in Application No. 200980142743.X, dated Jun. 22, 2015, 3 pages.

European Patent Office, Office Action Issued in Application No. 03811814.4, dated Jul. 20, 2616, Germany, 4 pages.

European Patent Office, Office Action issued in Application No. 09811814.4, dated Jul. 31, 2017, Germany, 4 pages.

State Intellectual Property' Office of the People's Republic of China, Office Action Issued in Application No. 20161066651.9, dated Dec. 18, 2017, 9 pages.

European Patent Office, Extended European Search Report Issued in Application No. 19211375.1, dated Apr. 17, 2020, Germany, 7 pages.

* cited by examiner

FIG. 4
FIG. 5
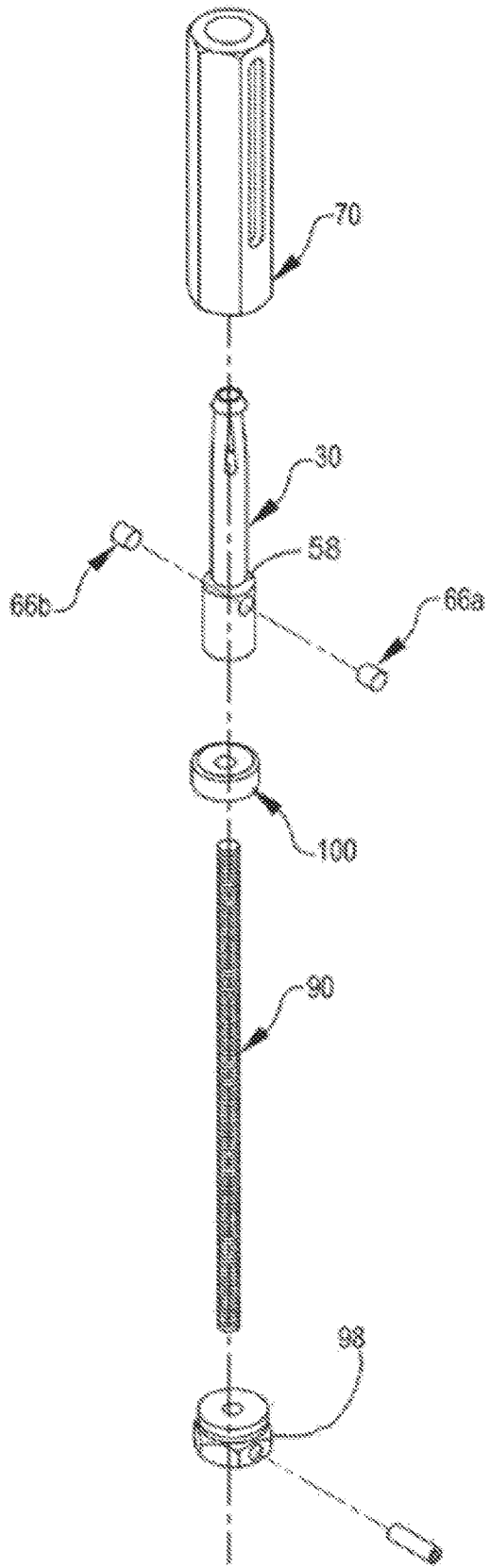
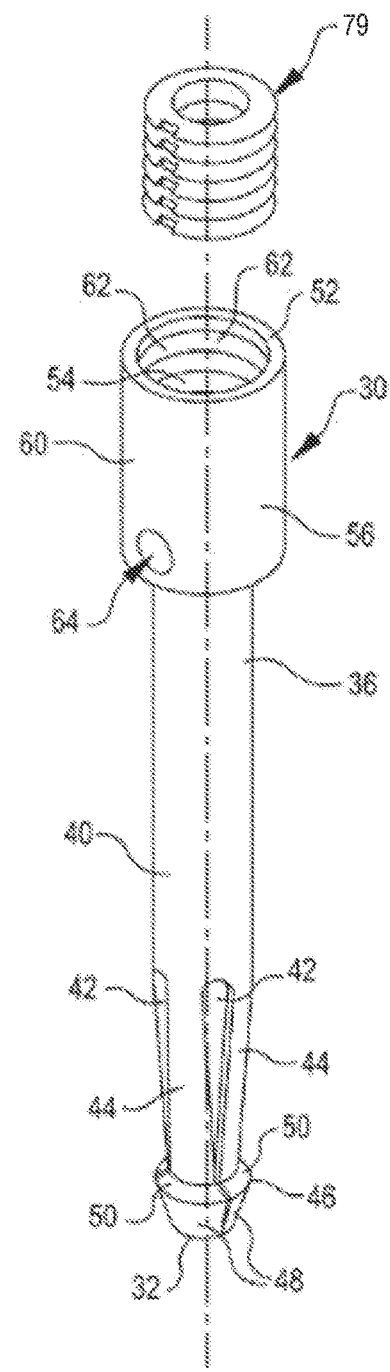

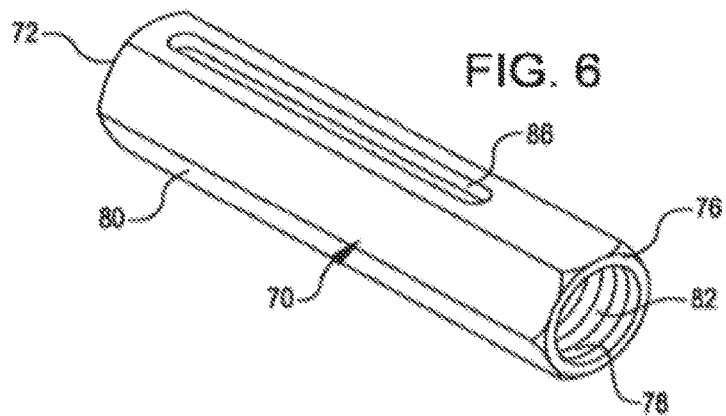
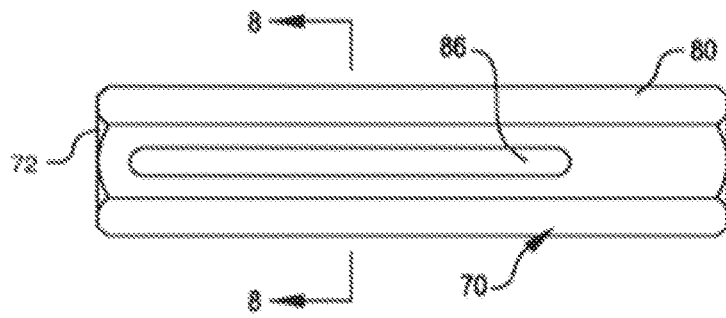 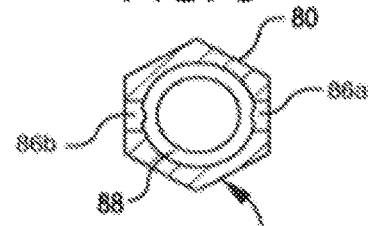
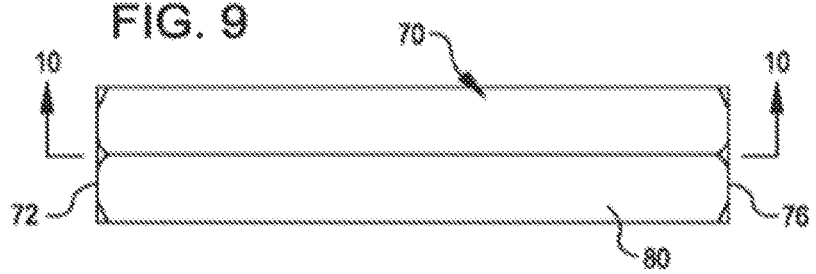
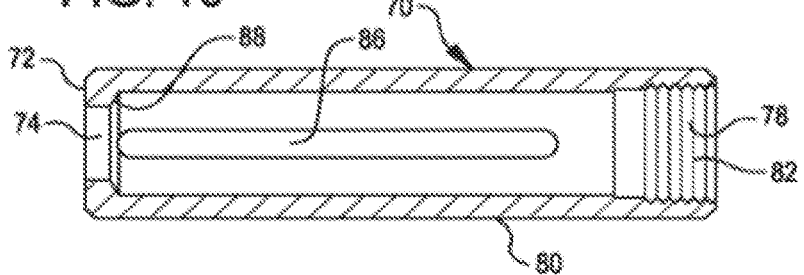

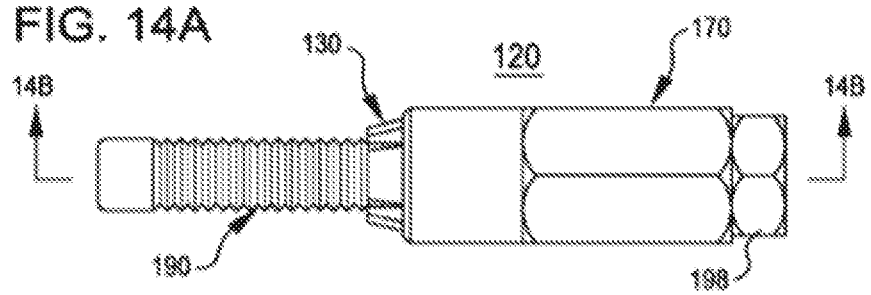
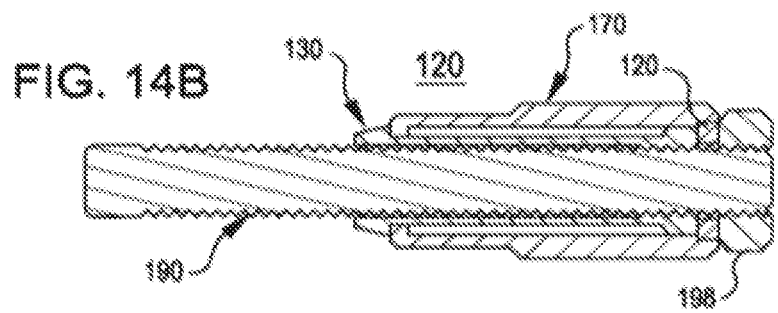
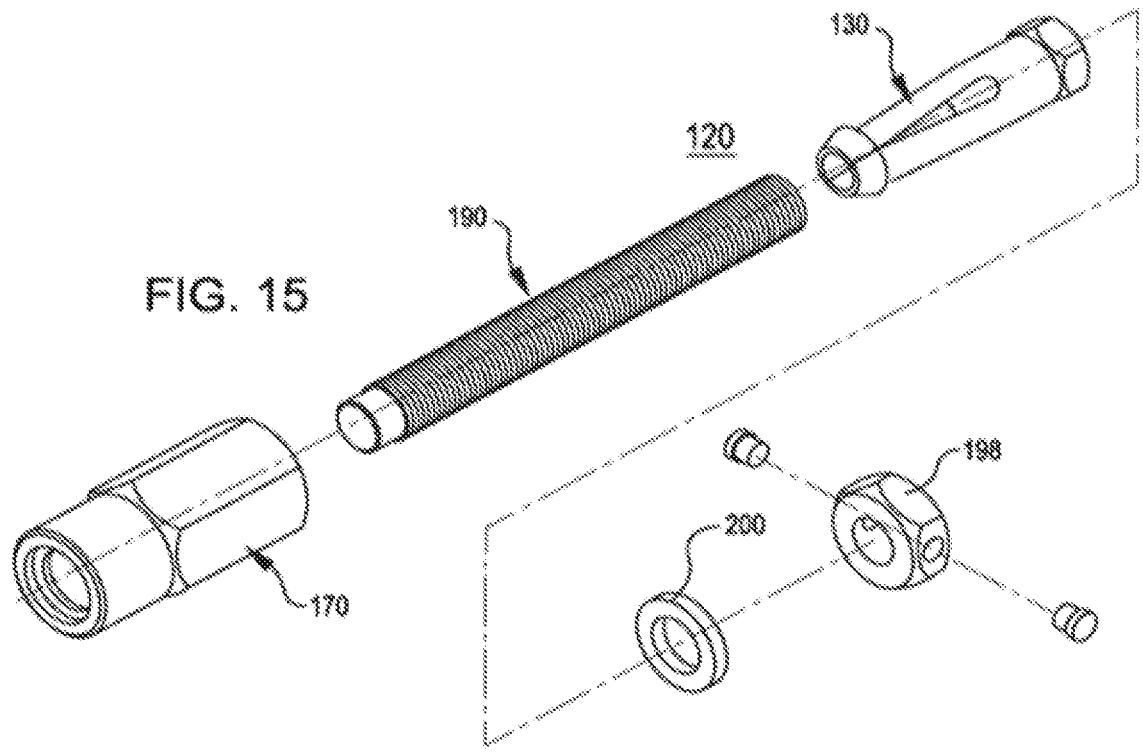

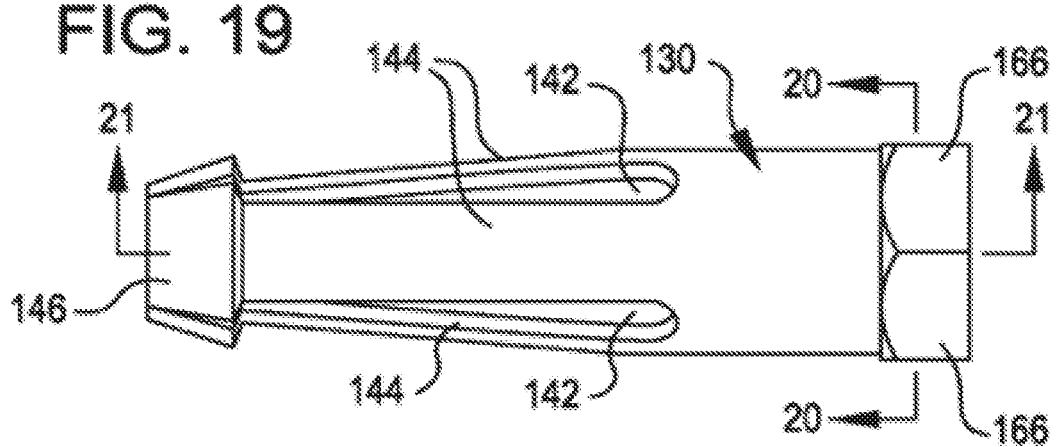
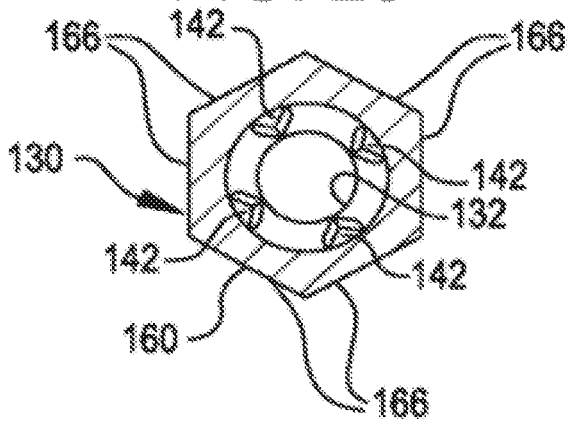
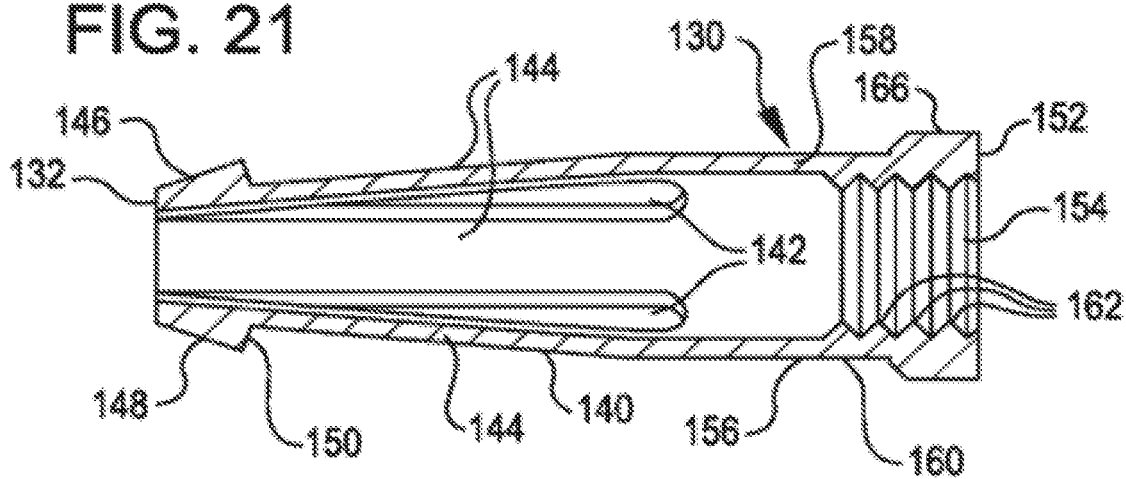

TEMPORARY FASTENERS

CROSS-REFERENCE TO RELATED APPLICATIONS

The present application is a divisional of U.S. Non-Provisional patent application Ser. No. 13/037,349, entitled "TEMPORARY FASTENERS", and filed on Feb. 28, 2011. U.S. Non-Provisional patent application Ser. No. 13/037,349 is a continuation of International Application No. PCT/US2009/004884 entitled "TEMPORARY FASTENERS", and filed on Aug. 26, 2009. International Application No. PCT/US2009/004884 claims priority to U.S. Provisional Application No. 61/208,188 entitled "TEMPORARY FASTENERS", and filed on Feb. 20, 2009. International Application No. PCT/US2009/004884 claims further priority to U.S. Provisional Application No. 61/190,215 entitled "TEMPORARY FASTENERS", and filed on Aug. 26, 2008. The entire contents of each of the above-listed applications are hereby incorporated by reference for all purposes.

SUMMARY OF THE INVENTION

The invention is directed towards temporary fasteners (also known as "tack" fasteners) used to hold, at least temporarily, at least two work pieces together where a portion of the fastener is disposed in substantially aligned holes or bores formed in the work pieces. In such a configuration, the outer most work pieces are brought into compression with each other either directly or through any intermediary work pieces by portions of the temporary fastener.

Fasteners according to the invention comprise a housing body, a collet body and a translatable central body. The housing body is configured to receive both a portion of the collet body and a portion of the translatable central body wherein another portion of the collet body and a portion of the housing body provide the work piece contacting surfaces and wherein the translatable central body functions to actively and/or passively displace and/or converge or restore radially displaceable portions of the collet body.

Collet bodies of the various invention embodiments each define a longitudinal axis and generally comprise a first or distal end defining a first generally circular opening and a second or proximal end defining a second generally circular opening. Adjacent to the first end is a first wall portion having an inner surface, an outer surface, and defining at least two secondary slots extending longitudinally from the first end to thereby create at least two flexible fingers. Adjacent to the second end is a second wall portion having an inner surface, and an outer surface.

Depending upon the nature of an invention embodiment, the flexible fingers can be characterized as having a converging, diverging or constant progressing radial profile in a nominal or resting state. As used herein, the term "progressing radial profile" means a series of radius measurements taken along a segment of the collet body axis to the relevant wall outer periphery. Many embodiments comprise collet bodies with a converging progressive radial profile for the first wall portion, e.g., the fingers. This profile minimizes the insertion force necessary to insure that the first or distal end of the collet body extends past the most distal work piece, decreases collet body wear, reduces or eliminates undesired work piece deformation, and enhances the removability of the fasteners from the work pieces.

In addition to the foregoing, a generally annular protrusion extends from the first wall portion, preferably at the first or distal end. The annular protrusion comprises a leading face and a trailing face, both of which can be characterized as segmented by the secondary slots formed in the collet body, where the trailing face comprises a portion of the collet body that is in compressive contact with a work piece during clamp up. For the reasons expressed above, a converging progressive radial profile is particularly attractive in embodiments wherein the annular protrusion materially extends from the outer surface of the first wall portion.

Separating the collet body first and second wall portions may be a mid body portion. Fastener embodiments of the invention having a particularly long stroke or working range will also have a mid body portion that is comparatively long with respect to embodiments having a short stroke or working length, which may not have a mid body portion. The collet body may optionally define a primary slot extending from the first end and preferably (although not necessarily) to the second end. The primary slot may be parallel to the collet body axis, linear but skew to the axis or helical, depending upon the embodiment.

As intimated above, the nature of the collet body material affects its performance. While the collet body can be formed from a myriad of materials, any such materials will have memory properties, malleable properties, or a combination of the two. A memory material will permit temporary distortion of the collet body fingers until the distorting force has been removed, where after the affected portions will return to their initial state or as close to the initial state as possible. Suitable memory materials include spring steel, plastics, composites, and the like. A malleable material will cause a distortion resulting from the application of at least one force to permanently alter the physical state of the affected collet body portion. Suitable malleable materials include certain steels, aluminum and its alloys, titanium and its alloys, and the like. A combination material will exhibit a hybrid response, the nature of which depends largely upon the composition of the material and its environment of use. The intended application for fasteners comprising collet bodies will generally determine the most desirable material composition.

For additional disclosure regarding collet bodies, please refer to International Publication No. WO 2003-069971, which is incorporated herein by reference.

Collet bodies according to the invention that rely upon rotation of the translatable central body to effectuate translation/reciprocation of the collet body within the housing body further comprise a first part of a two part anti-rotation means (hereinafter "collet body ARM" with specific reference to the first part, and "ARM" with general reference to both parts). A variety of ARM arrangements are suitable for counteracting induced rotation of the collet body within the housing body; a valid collet body ARM need only use structure of or associated with the collet body that compressionally impinges a portion of the housing body when rotated within at least a portion of the housing body such that further rotation of the collet body is not possible within the design limits of the fastener.

One series of embodiments relies upon the incorporation of a non-circular cross section portion of the collet body to function as the collet body ARM, e.g., (a)symmetrical elliptical, or regular or irregular polygonal cross section. A simple illustration of this form is a key (protrusion) and slot arrangement where the key may be present on a portion of the collet and the slot formed in the housing body, or vice versa. Naturally, a plurality of keys and slots may be used. The geometric crosssection of the key may be rectilinear, curvilinear and/or polygonal. Moreover, while it is preferable that the housing body bore/hole be complementary in geometry to the key arrangement, it is only necessary that the bore/hole rotationally interfere with the key arrangement, but otherwise permit translation of the first part of the ARM in the second part, as described below. Thus, for example, there may be only two key features present on the collet body, but four slots formed in the housing body. So long as at least one key feature operates to prevent collet body rotation, it is considered a suitable collet body ARM.

Another series of embodiments permits the use of collet bodies having circular peripheral profiles, but provides for at least one, and preferably two, radially extending appendages. These appendages or arms can be considered "keys", but are usually of sufficient radial length from the collet body so as to require throughbody slots formed in the housing body, which will be discussed in detail below.

The housing bodies used in various invention embodiments include first or distal ends and second or proximal ends, by convention, as well as exterior surfaces and interior surfaces. The interior surface of a given housing body defines a bore or hole that extends from the proximal end to the distal end, into which a portion of the collet body comprising the collet body ARM is operatively located and is permitted to axially reciprocate therein. While the bore or hole need not be of constant cross sectional dimensions and/or geometry from one end to the other, in many embodiments of the invention, this is true. The interior surface of the housing body in one series of embodiments further defines a second part of the two part ARM (hereinafter "housing body ARM" with specific reference to the second part) while a sectional portion of the housing body in another series of embodiments defines the housing body ARM.

The housing body also includes a first part of a two part translation arresting means (hereinafter "housing body TAM" with specific reference to the first part, and "TAM" with general reference to both parts) for preventing unintentional escapement of the collet body from at least one end of the housing body where the collet body includes a second part of TAM (hereinafter "collet body TAM" with specific reference to the second part). The housing body TAM generally comprises structure defining an orifice having a diameter less than the collet body TAM, which in many cases comprises the collet body ARM.

Finally, the translatable central bodies found in the various invention embodiments are disposed in the housing bodies and selectively operate to affect the radially oriented displacement of the collet body fingers. Each translatable central body includes a working portion for contacting the inside surface of the fingers when axially translated there towards, and a drive portion for receiving rotational and/or axial force(s) that cause, either directly or indirectly, the working portion to engage with or retract from the collet body fingers.

Due to the interaction between the various fastener components, radial displacement of the collet body fingers by the translatable central body occurs when the central body is moved towards the distal end of the housing. As a consequence, the drive portion of the translatable central body is caused to move into the hole/bore of the housing body. At full translation, many invention embodiments have only a minimal portion of the central body exposed beyond the second or proximal end of the housing body. This state is of particular benefit in certain manufacturing environments wherein minimal fastener height on the tool side is desired or required.

As discussed above with reference to collet bodies with or without ARM(s), the translatable central body of any given fastener according to the invention may be subjected to external axially or rotationally applied force, the later being transformed into axial movement through interaction with a threaded portion of the collet body or linked structure. Either of these forces results in movement of the working portion of translatable central body either towards or away from the collet body fingers. For reference purposes, the former is referred to herein as axially induced translation of the translatable central body while the latter is referred to herein as rotationally induced translation of the translatable central body.

In axially induced reciprocating fastener embodiments, it is not necessary to provide an ARM between the collet body and the housing body - an axial force is applied to the drive portion of the translatable central body, which moves the central body towards the collet body, thereby causing reciprocation over multiple instances of such axial force application. In these invention embodiments, however, it is advantageous to have a biasing means for restoring the translatable central body to its initial state of retraction from the collet body (thereby ensuring that the working portion of the central body is not in contact with the inner surfaces of the collet body fingers, and that the fastener is immediately ready for use). In many embodiments, this biasing means comprises a compression spring wherein one end thereof acts on the housing body at the second or distal end, and another end acts on the translatable central body to thereby cause maximum permitted extension of the central body from the collet body. Application of an axial force to the translatable central body in opposition to the spring bias thereby causes compression of the spring, and permits the working portion of the translatable central body to engage with the inner surfaces of the collet body fingers.

In rotationally induced reciprocating fastener embodiments, the translatable central body comprises a threaded portion that interacts with the collet body either directly through a complementary structure on/in the collet body or indirectly through a linkage to the collet body, whereby rotation of the central body results in translation of the collet body within the housing body. As noted previously, rotationally induced reciprocation embodiments will necessarily employ an ARM so that rotation of the translatable central body translates into axial translation (and reciprocation during counter rotation) of the collet body. In one series of rotationally induced reciprocation embodiments, an interior surface portion of the collet body, usually at or proximate to the second or proximal end, defines threads that are functionally complementary to the threaded portion formed on the translatable central body. In another series of embodiments, a threaded element such as a nut or collar, is securely affixed to the second or proximal end of the collet body. An advantage to using a threaded nut is that the outer surface cross sectional profile is a polygon, which beneficially can function as a collet body ARM as well as a collet body TAM.

Having broadly described the various components of the several invention embodiments, specific implementations thereof can be generally characterized into several forms, namely, axially operated embodiments and rotationally operated embodiments, with the latter having internal ARM variants and external ARM variant. Each form of the invention has advantages over the other, but both share many of the same core components.

Internal ARM series embodiments are generally characterized as having a housing body with a radially closed interior surface wherein the interior surface functions as a reactive structure (or second part) of the collet body ARM. As such, the internal surface geometry of the interior surface (i.e., cross section geometry) is sufficiently complementary to the collet body ARM to prevent unmitigated rotation of a collet body therein, and is axially consistent to permit substantial axial translation within the housing body. Preferably, the interior surface has a cross section geometry that is highly complementary to the collet body ARM such that each portion of the collet body ARM has a corresponding reactive structure at the interior surface of the housing body.

For example in a first instance, the interior surface of the housing body has a hexagonal cross section with each facet thereof having a distance from the housing body axis of $R_f$. The collet body ARM has a rectangular cross section profile where the major axis is $\approx 2R_f$ and a minor axis of $\ll 2R_f$ such that there would otherwise be no rotationally interference. When disposed within the housing body and subject to rotation, two sides of the collet body ARM would contact the interior surface of the housing body while two sides would not; only two of the six sides of the interior surface of the housing body would then function as reactive structures or the second part of the two part ARM. In a second instance, the collet body ARM has a hexagonal cross section profile that is nominally smaller than the internal dimensions of the interior surface of the housing body (to permit free translation within the housing body). In this case, when disposed within the housing body and subject to rotation, portions of all six sides of the collet body ARM would contact the interior surface of the housing body; portions of all six sides of the interior surface of the housing body would then function as reactive structures or the second part of the two part ARM.

External ARM series embodiments are generally characterized as having a housing body with at least one generally axially aligned slot extending from the interior surface to the exterior surface of the housing body to receive a corresponding number of collet body ARM(s). Instead of finding a reactive structure at the interior surface of the housing body (second part of the ARM), the reactive structure is a portion of the sectional perimeter of the housing body slot, i.e., the wall(s) that define(s) the at least one slot. Of course, it is possible to have both internal and external ARM functionality in a single fastener.

For purposes of this patent, the terms "area", "boundary", "part", "portion", "surface", "zone", and their synonyms, equivalents and plural forms, as may be used herein and by way of example, are intended to provide descriptive references or landmarks with respect to the article and/or process being described. These and similar or equivalent terms are not intended, nor should be inferred, to delimit or define per se elements of the referenced article and/or process, unless specifically stated as such or facially clear from the several drawings and/or the context in which the term(s) is/are used.

BRIEF DESCRIPTION OF THE DRAWINGS

FIG. 4 is an exploded perspective view of the first invention;

FIG. 5 is an isolated perspective view of the collet body of the first invention embodiment;

FIG. 6 is an isolated perspective view of the housing body of the first invention embodiment;

FIG. 7 is a first side elevation view of the embodiment of FIG. 6;

FIG. 8 is a plan view in cross section taken substantially along the line 8-8 in FIG. 7;

FIG. 9 is a second side elevation view of the embodiment of FIG. 6;

FIG. 10 is a side elevation view in cross section taken substantially along the line 10-10 in FIG. 9;

FIG. 14A is a side elevation view of the second invention embodiment shown in a fourth state;

FIG. 14B is a side elevation view in cross section of the embodiment of FIG. 14A;

FIG. 15 is an exploded perspective view of the second invention embodiment;

FIG. 19 is an isolated side elevation view of the collet body of the second embodiment;

FIG. 20 is a plan view in cross section taken substantially along the line 20-20 in FIG. 19; and FIG. 21 is an elevation view in cross section taken substantially along the line 21-21 in FIG. 19.

DESCRIPTION OF INVENTION EMBODIMENTS

Preface: The terminal end of any numeric lead line in the several drawings, when associated with any structure or process, reference or landmark described in this section, is intended to representatively identify and associate such structure or process, reference or landmark with respect to the written description of such object or process. It is not intended, nor should be inferred, to delimit or define per se boundaries of the referenced object or process, unless specifically stated as such or facially clear from the drawings and the context in which the term(s) is/are used. Unless specifically stated as such or facially clear from the several drawings and the context in which the term(s) is/are used, all words and visual aids should be given their common commercial and/or scientific meaning consistent with the context of the disclosure herein.

With the foregoing in mind, the following description is presented to enable a person skilled in the art to make and use the claimed invention. Various modifications to the described embodiments will be readily apparent to those skilled in the art, and the generic principles disclosed herein may be applied to other embodiments and applications thereof without departing from the spirit and scope of the present invention, as defined by the appended claims. Thus, the claimed invention is not intended to nor should be limited to the disclosed and/or described embodiments, but is to be accorded the widest scope consistent with the principles and features disclosed herein.

Figure 1:
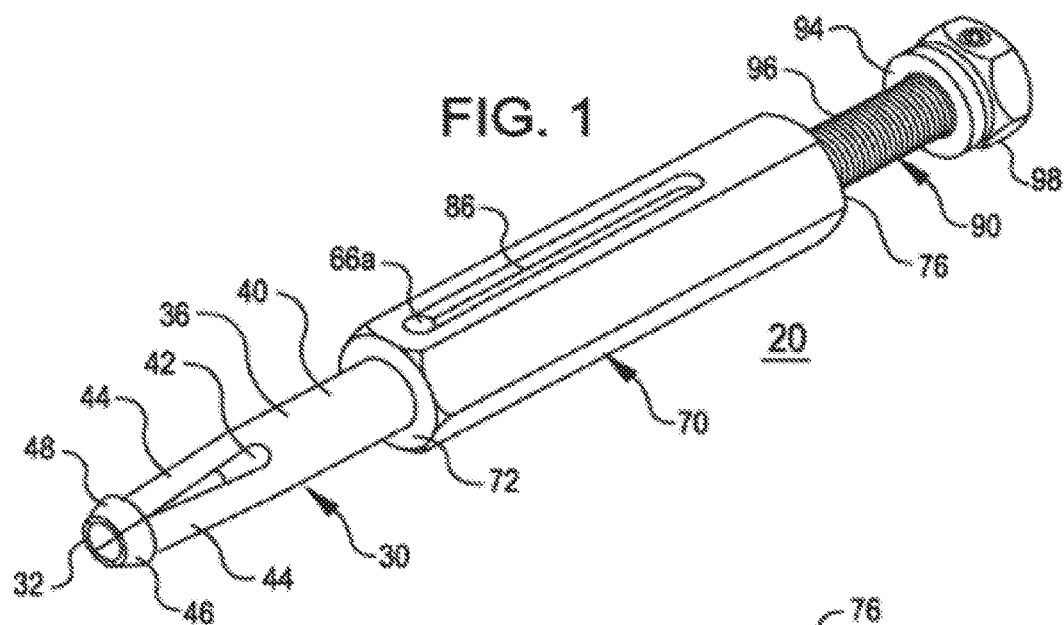
FIG. 1 is a perspective view of a first invention embodiment shown in a first state, and comprising a housing body, a collet body and translatable central body wherein the anti-rotation means comprises collet body radially extending members in the form of set screws and translatably accommodating slots formed in the housing body.
Figure 2:
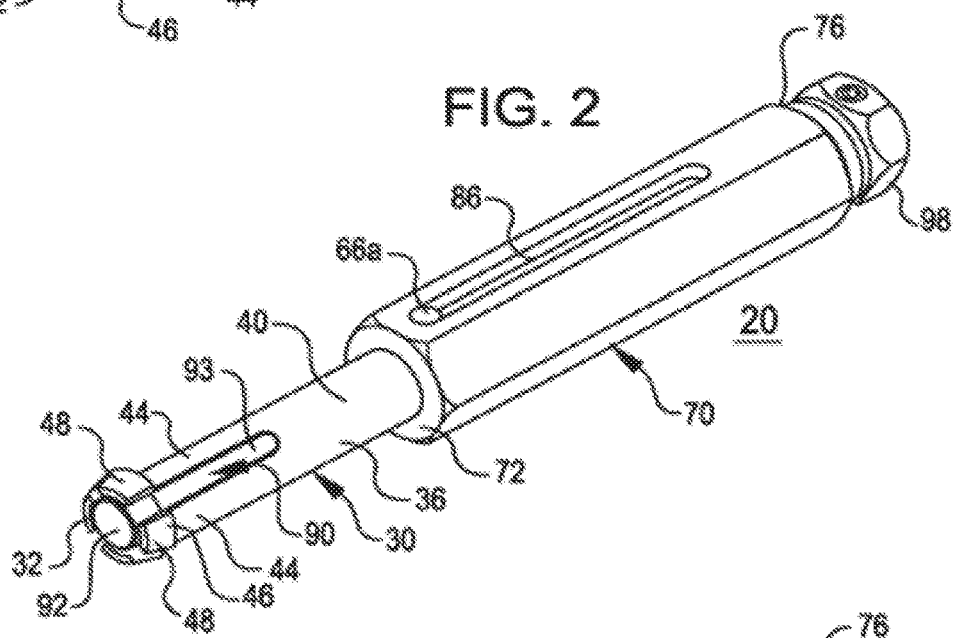
FIG. 2 is a perspective view of the first invention embodiment shown in a second state.
Figure 3:
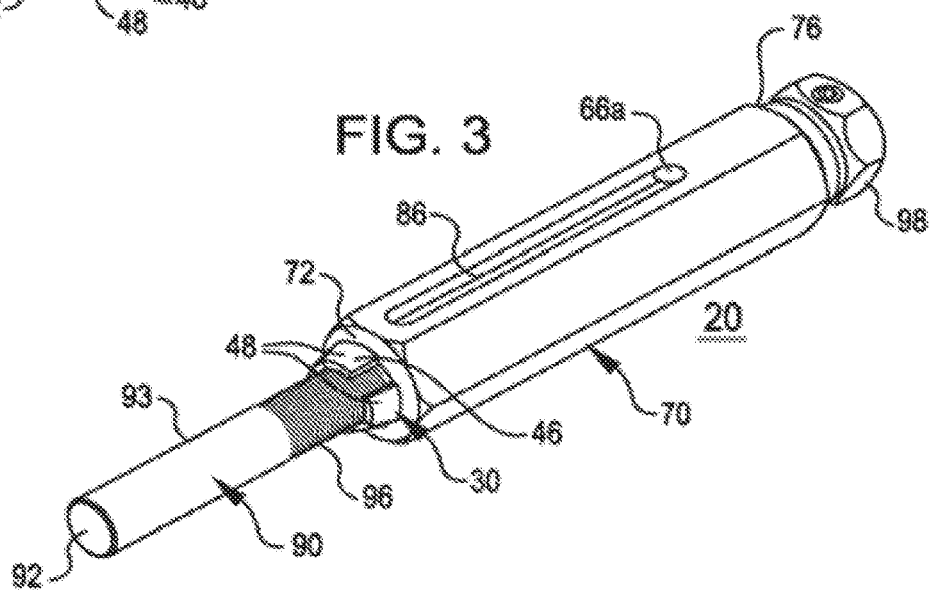
FIG. 3 is a perspective view of the first invention embodiment shown in a third state.
Figure 11A:
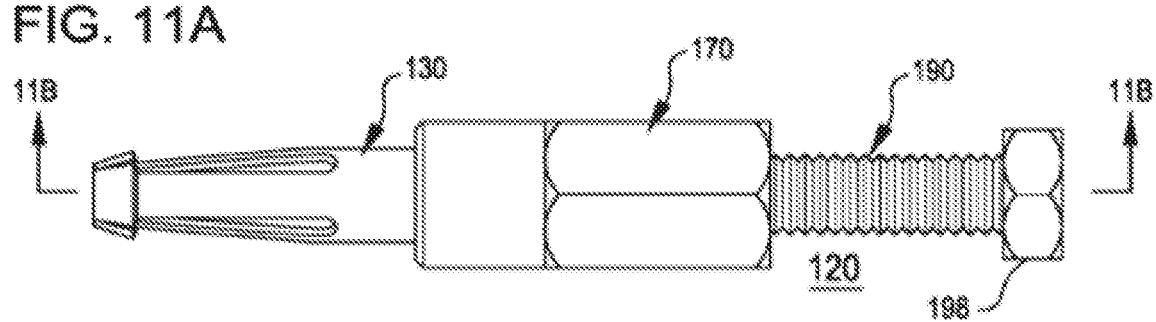
FIG. 11A is a side elevation view of a second invention embodiment shown in a first state, and comprising a housing body, a collet body and translatable central body wherein the anti-rotation means comprises collet body surface features in the form of a faceted head and a polygonal inner surface formed in the housing body.
Figure 11B:
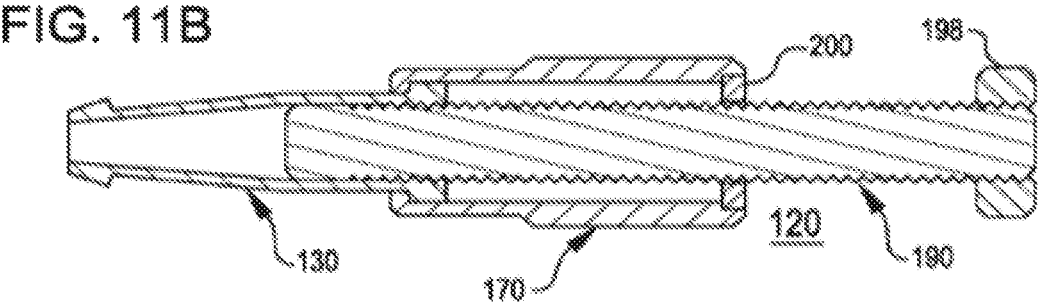
FIG. 11B is a side elevation view in cross section view of the embodiment of FIG. 11A.
Figure 11C:
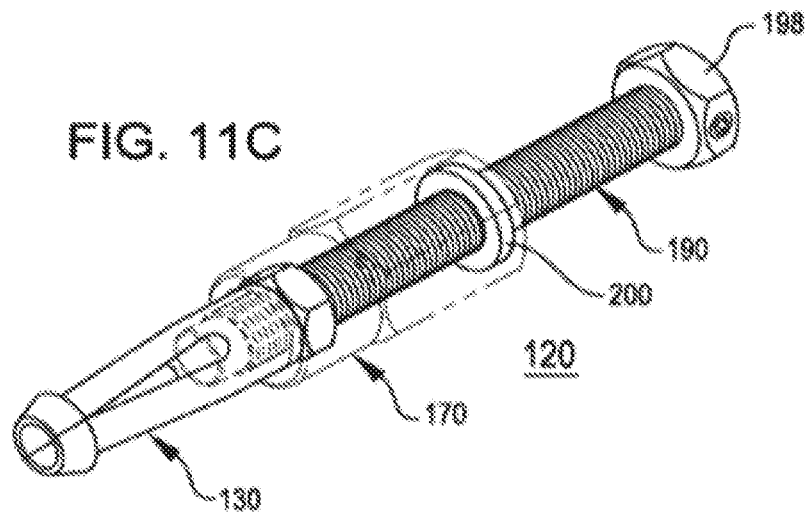
FIG. 11C is a perspective view of the embodiment of FIG. 11 A.
Figure 12A:
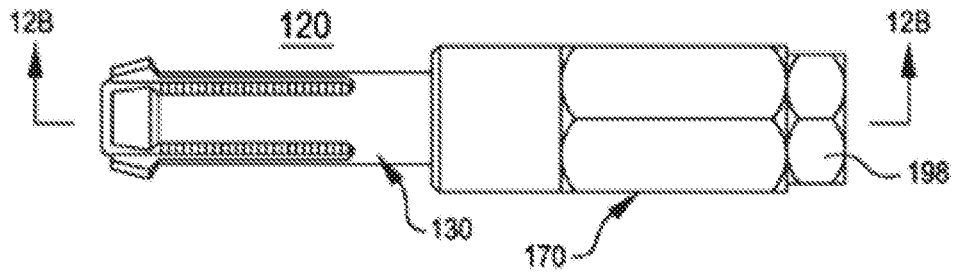
FIG. 12A is a side elevation view of the second invention embodiment shown in a second state.
Figure 12B:
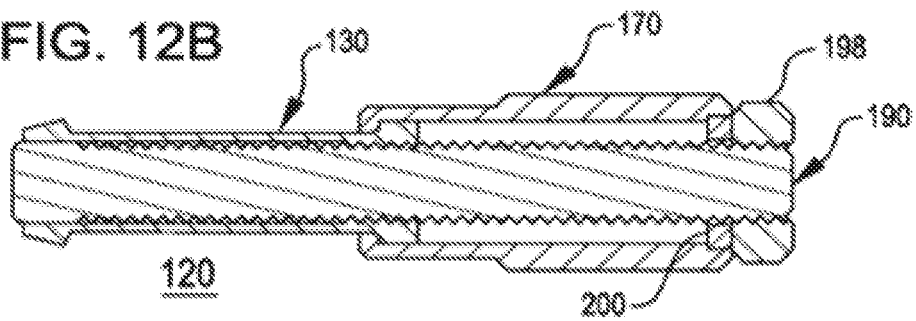
FIG. 12B is a side elevation view in cross section view of the embodiment of FIG. 12A.
Figure 12C:
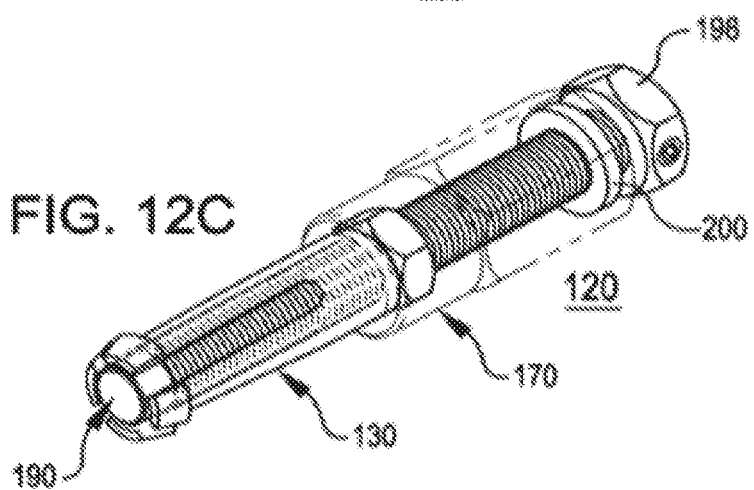
FIG. 12C is a perspective view of the embodiment of FIG. 12A.
Figure 13A:
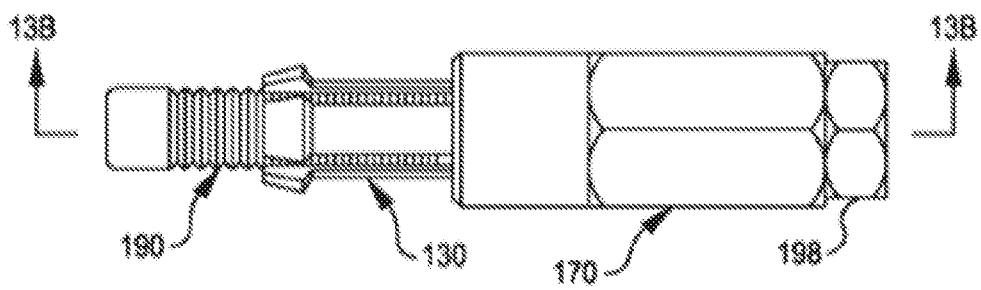
FIG. 13A is a side elevation view of the second invention embodiment shown in a third state.
Figure 13B:
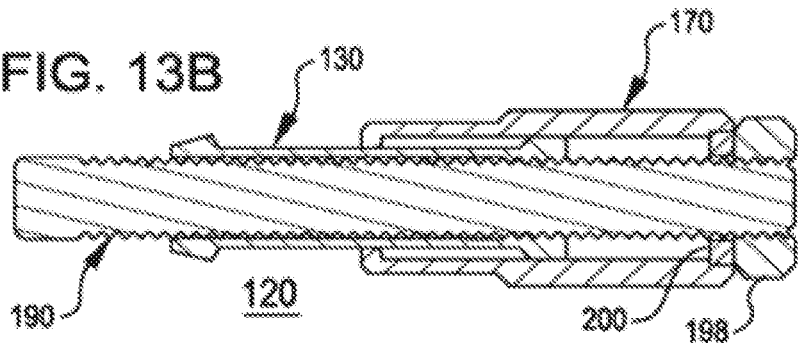
FIG. 13B is a side elevation view in cross section view of the embodiment of FIG. 13A.
Figure 16:
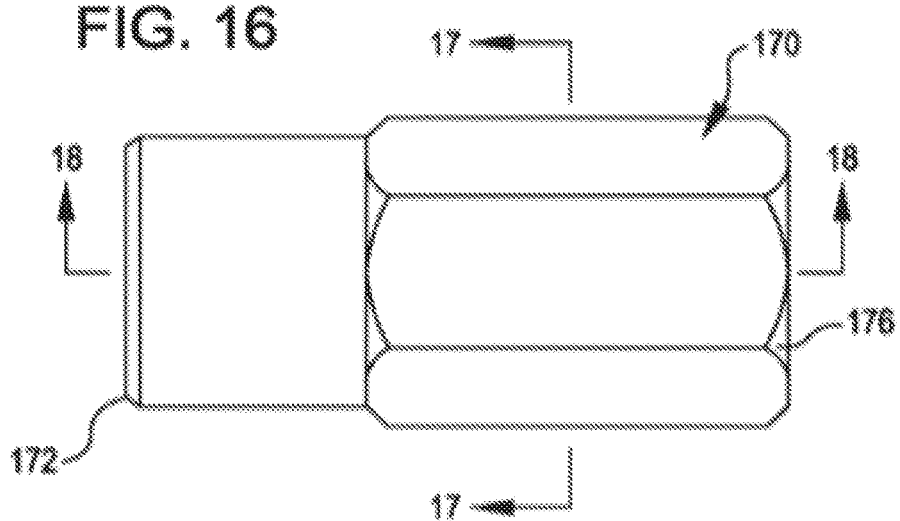
FIG. 16 is an isolated side elevation view of the housing body of the second embodiment.

Turning then to the several embodiments, wherein like numerals indicate like parts, and more particularly to FIGS. 1-10, a first embodiment of the invention relating to an inexpensive temporary fastener 20 having an external or projecting collet body ARM is shown from initial engagement with a translatable central body in the form of a threaded rod 90 with a col let body 30 (FIG. 1) to a fully clamped-up configuration (FIG. 3). As shown in the various Figures, fastener 20 comprises a collet body 30 translatably disposed in housing body 70 and into which threaded rod 90 may be rotationally engaged whereby rotation of rod 90 is transformed into translational movement of collet body 30 in housing body 70.

Collet body 30, best shown in FIG. 5, includes first wall portion 40 whereby a plurality of slots 42 defined thereby establish fingers 44 that terminate at first or distal end 32 and that comprise protruding portion 46, each segment of which has leading face 48 and trailing face 50. Collet body 30 further includes second wall portion 60, which defines holes 64 that extend from outer surface 56 to inner surface 54, and which terminates at second or proximal end 52, and a mid body portion 36 there between the first wall portion 40 and the second wall portion 60. Inner surface 54 defines threads 62, which are complementary to threaded portion 96 of threaded rod 90, thereby permitting threadable engagement there between. A threaded element 79 is also shown in FIG. 5.

Housing body 70, best shown in FIGS. 6-10, includes first or distal end 72, second or proximal end 76, inner surface 78, which includes threaded portion 82, the threads of which are complementary to threaded portion 96 of threaded rod 90, thereby permitting threadable engagement there between, and slots 86a/b, which will be described in more detail below. Distal end 72 defines reduced diameter bore or opening 74, and thereby establishes wall 88.

As best shown in FIG. 4, a first part of an external two-part anti-rotation means ("ARM") is established by engaging set screws 66a/b with holes 64, which thereby form a collet body ARM; housing body 70 defines, inter alia, the second part of the external two-part ARM, namely, two substantially axially aligned slots 86a/b sized to functionally receive set screws 66a/b, which thereby form a housing ARM. Note that set screws 66a/b do not interfere with the rotation of threaded rod 90, and because of their restricted freedom of movement within slots 86a/b, there is no need to mill or otherwise create surface features on inner surface 78 of housing body 70 (see FIGS. 6, 8, and 10). Also note that from the time fingers 44 are radially expanded (FIG. 2), thrust washer 94 and drive nut 98 of threaded rod 90 are in contact with proximal end 76 of housing body 70 through maximum stroke (FIG. 3), thereby achieving a very low clamp-up profile.

A feature of the illustrated embodiment is the presence of non-threaded portion 93 on threaded rod 90. As a consequence of feature, rod 90 cannot be "backed out" from collet body 30 during normal operation. A swaged collar or deformed threads can similarly function to prevent threaded disassociation between these components. An additional feature of the illustrated embodiment is the presence of wall 88, which functions as a first part of a two part translation arresting means ("TAM") by contacting wall 58 of collet body 30's second wall portion 56, which functions as a second part of the two part TAM, upon maximum extension of collet body 30 from housing body 70.

Tangible benefits of fastener 30 include a limited parts count, scalability of certain parts for disparate applications, and the use of readily available parts as opposed to custom fabricated parts. FIGS. 4-10 exemplify many of these benefits. The discrete parts of fastener 20 are best shown in FIG. 4. With the exception of collet body 30 and housing body 70, it can be seen that threaded rod 90 is merely a piece sectioned from a longer continuous threaded rod, that drive nut 98 is a conventional nut that is swaged, welded or, in the illustrated example, fastened via a roll pin to threaded rod 90, and that bushing 100 is a conventional piece as well. And while housing body 70 is preferably matched to an intended collet body 30, a range of collet bodies and threaded rods can be accommodated by modifying the internal diameter of bushing 100 and using col let bodies with standardized second wall diameters, regardless of the diameter of opening 74. In such instances, however, it may be beneficial to introduce another bushing at end 72 to closely match the working diameter of first wall portion 40.

FIGS. 11A-21 show a second fastener 120 comprising collet body 130, housing body 170, which includes bushing 200, and threaded rod 190 to which is attached drive nut 198 from initial engagement of threaded rod 190 with collet body 130 (FIGS. 11A-C) to a fully clamped-up configuration (FIGS. 14A and 148).

Figure 17:
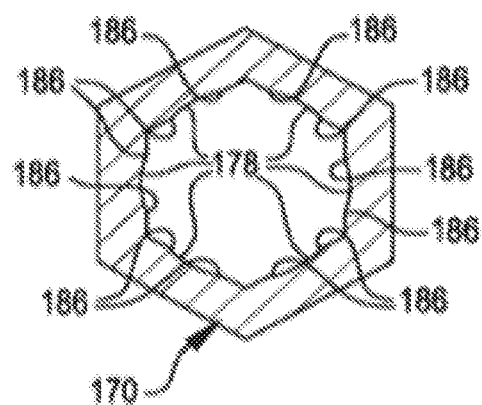
FIG. 17 is a plan view in cross section taken substantially along the line 17-17 in FIG. 16.
Figure 18:
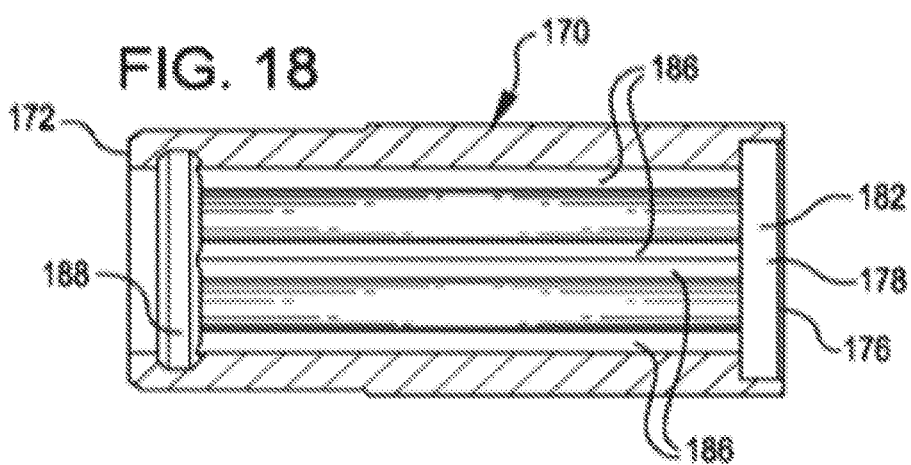
FIG. 18 is a cross section view taken substantially along the line 18-18 in FIG. 116.

Unlike fastener 20, fastener 120 includes an internal ARM, although most other aspects of the fastener remain similar (for example, collet body 130, best shown in FIGS. 19-21, includes first wall portion 140 whereby a plurality of slots 142 defined thereby establish fingers 144 that terminate at first or distal end 132 and that comprise protruding portion 146, each segment of which has leading face 148 and trailing face 150, and second wall portion 160, which terminates at second or proximal end 152, while inner surface 154 defines threads 162, which are complementary to threaded rod 90, thereby permitting threadable engagement there between. Thus, a first part of an internal two-part ARM (the collet body ARM) comprise facets 166 formed on second wall 160 (see FIGS. 19-21) while facets 186, which comprise part of inner surface 178 of housing body 170, comprise the second part of the external two-part ARM (the housing ARM) as is best shown in FIGS. 17 and 18.

Because of machining consequences when forming facets 186, it may be necessary to retrofit housing body 170 with the first part of a two part TAM. Thus, a snap ring may be introduced in recess 188 formed near housing body at first or distal end 182 (see FIG. 18) to form this part, as did wall 88 in fastener 20. Similarly, bushing 200 may be necessary to establish the requisite diameter for receiving rod 190; recess 182 is therefore formed at second or proximal end 176 into which bushing 200 may be seated.

What is claimed:
1. A fastener comprising:
   a housing body including a bore extending along a longitudinal axis from a proximal end of the housing body, a housing body anti-rotation part, and a reduced diameter opening at a distal end of the housing body;

a collet body profiled to partially translate within the housing body bore, having a collet body anti-rotation part positioned at least partially within the housing body, and having a plurality of clamping fingers axially extending from a wall portion of the collet body;

a threaded rod including a threaded section that threadingly engages a threaded section of the collet body; and a removable bushing positioned at least partially in the housing body bore;

where rotation of the collet body is substantially prevented by an interaction between the housing body anti-rotation part and the collet body anti-rotation part during fastener clamping and unclamping;

where the removable bushing and the reduced diameter opening in the bore prevent escapement of the collet body anti-rotation part from the housing body;

where rotation of the threaded rod in opposite directions causes the collet body to translate in opposing directions without rotating in relation to the housing body to induce axial clamping and unclamping and where an axial position of the threaded rod;

where the housing body anti-rotation part includes polygonal cross-section complimentary profiled with a polygonal cross-section of the collet body anti-rotation part and where the housing body includes a wall with an interior surface that forms the housing body anti-rotation part; and where the threaded rod and the collet body are designed to threadingly engage one another while a portion of the threaded rod is positioned between the plurality of clamping fingers and the plurality of clamping fingers extend inwardly toward a collet body axis.

2. The fastener of claim 1, further comprising a drive nut attached a proximal end of the threaded rod.

3. The fastener of claim 2, where the drive nut is positioned axially exterior to the housing body.

4. The fastener of claim 1, where the threaded rod has an axial length equal to or greater than a sum of the axial lengths of the housing body and the collet body.

5. The fastener of claim 1, where the distal end of the housing body has a diameter less than a diameter of a head of the collet body.

6. A fastener comprising:

a housing body including a bore extending along a longitudinal axis from a proximal end of the housing body, a housing body anti-rotation part, and a reduced diameter opening at a distal end of the housing body;

a collet body profiled to partially translate within the housing body bore, having a collet body anti-rotation part positioned at least partially within the housing body, and a plurality of clamping fingers axially extending from a wall portion of the collet body;

a threaded rod threadingly engaged with an inner threaded portion of the collet body, where rotation of the threaded rod in opposite directions causes the collet body to translate in opposing directions in relation to the housing body to induce axial clamping and unclamping; and a removable bushing positioned at least partially in the housing body bore; and a drive nut coupled to a proximal end of the threaded rod and including a lower axial side that is positioned axially above the removable bushing;

where rotation of the collet body is substantially prevented during the axial translation by an interaction between the housing body anti-rotation part and the collet body anti-rotation part during fastener clamping and unclamping;

where the removable bushing and the reduced diameter opening in the bore prevent escapement of the collet body anti-rotation part from the housing body;

where the housing body anti-rotation part includes polygonal cross-section complimentary profiled with a polygonal cross-section of the collet body anti-rotation part and where the housing body includes a wall with an interior surface that forms the housing body anti-rotation part; and where the threaded rod and the collet body are designed to threadingly engage one another while a portion of the threaded rod is positioned between the plurality of clamping fingers and the plurality of clamping fingers extend inwardly toward a collet body axis.

7. The fastener of claim 6, where the drive nut has a polygonal cross-section.

8. The fastener of claim 6, where the removable bushing has an annular shape.

9. A fastener comprising:

a housing body including a bore extending along a longitudinal axis from a proximal end of the housing body, a housing body anti-rotation part, and a reduced diameter opening at a distal end of the housing body;

a collet body profiled to partially translate within the housing body bore, having a collet body anti-rotation part positioned at least partially within the housing body, and a plurality of clamping fingers axially extending from a wall portion of the collet body; and a threaded rod threadingly engaged with an inner threaded portion of the collet body and a threaded portion of the housing body, where rotation of the threaded rod in opposite directions causes the collet body to translate in opposing directions in relation to the housing body to induce clamping and unclamping;

a removable bushing positioned at least partially in the housing body bore; and a drive nut coupled to a proximal end of the threaded rod and positioned axially above the removable bushing;

where rotation of the collet body is substantially prevented during the axial translation by an interaction between the housing body anti-rotation part and the collet body anti-rotation part during fastener clamping and unclamping;

where the removable bushing and the reduced diameter opening in the bore prevent escapement of the collet body anti-rotation part from the housing body;

where the housing body anti-rotation part include a plurality of facets complimentary profiled with a plurality of facets in the collet body anti-rotation part;

where the plurality of clamping fingers extend inwardly toward the longitudinal axis of the fastener in an unclamped configuration and are radially expanded in a clamped configuration;

where the housing body anti-rotation part includes polygonal cross-section complimentary profiled with a polygonal cross-section of the collet body anti-rotation part and where the housing body includes a wall with an interior surface that forms the housing body anti-rotation part and an exterior surface that has a polygonal cross-section;

where the threaded rod and the collet body are designed to threadingly engage one another while a portion of the threaded rod is positioned between the plurality of clamping fingers and the plurality of clamping fingers extend inwardly toward a collet body axis.

10. The fastener of claim 9, where the drive nut is positioned axially exterior to the housing body.

\* \* \* \* \*